(12) United States Patent
Hartmann (10) Patent No.: US 8,756,656 B1
(45) Date of Patent: Jun. 17, 2014

(54) SYSTEMS AND METHODS FOR CREATING AND SYNCHRONIZING SECURITY METADATA WITHIN SYNCHRONIZED-DATA NETWORKS

(75) Inventor: Alfred Hartmann, Round Rock, TX (US)

(73) Assignee: Symantec Corporation, Mountain View, CA (US)

( * ) Notice: Subject to any disclaimer, the term of this patent is extended or adjusted under 35 U.S.C. 154(b) by 1192 days.

(21) Appl. No.: 12/241,308

(22) Filed: Sep. 30, 2008

(51) Int. Cl.
*G06F 21/00* (2013.01)

(52) U.S. Cl.
USPC ............... 726/3; 726/4; 726/5; 726/6; 726/9; 713/156; 713/168

(58) Field of Classification Search
USPC ............... 726/3, 26; 703/3; 709/223
See application file for complete search history.

(56) References Cited

U.S. PATENT DOCUMENTS

| | | | |
|---|---|---|---|
| 6,292,900 B1 * | 9/2001 | Ngo et al. | 726/6 |
| 2006/0115108 A1 * | 6/2006 | Rodriguez et al. | 382/100 |
| 2008/0005784 A1 * | 1/2008 | Miliefsky | 726/3 |
| 2008/0141379 A1 * | 6/2008 | Schmelzer | 726/26 |
| 2009/0019141 A1 * | 1/2009 | Bush et al. | 709/223 |

OTHER PUBLICATIONS

Jong-Phil Yang et al., "Practical Modification of an Efficient Public-Key Framework", The IEEE International Conference (EEE'04).*
"Google Drive", https://drive.google.com/#my-drive, as accessed Nov. 12, 2013.
"File synchronization", http://en.wikipedia.org/wiki/File synchronization, as accessed Nov. 12, 2013, Wikipedia, (Sep. 13, 2006).

* cited by examiner

*Primary Examiner* — Jason Lee
(74) *Attorney, Agent, or Firm* — ALG Intellectual Property, LLC (57) ABSTRACT

A computer-implemented method for creating and synchronizing security metadata for data objects within a synchronized-data network is disclosed. This method may comprise: 1) identifying a data object, 2) determining the trustworthiness of the data object, 3) generating security metadata for the data object that identifies the trustworthiness of the data object, and 4) synchronizing the security metadata within the synchronized-data network. The method may also comprise identifying a need to perform a security operation on the data object to determine the trustworthiness of the data object and then offloading or load balancing the security operation within the synchronized-data network. Corresponding systems and computer-readable media are also disclosed.

18 Claims, 7 Drawing Sheets

Synchronized-Data Network 300

SYSTEMS AND METHODS FOR CREATING AND SYNCHRONIZING SECURITY METADATA WITHIN SYNCHRONIZED-DATA NETWORKS

BACKGROUND

Consumers and businesses increasingly rely on multiple computing devices. Unfortunately, most conventional computing data models are platform centric, rather than information centric. This may create growing problems for users that may wish to keep their data up-to-date between multiple computing devices, such as desktops, laptops, PDAs, smart phones, remote network drives, or the like. For instance, when a user desires to modify a file (such as a word-processing file) stored on his/her laptop, the user must also manually transfer or modify a copy of the same file on his/her desktop in order for the modifications to appear on both devices.

Recently, some software developers have released information-centric data models that synchronize data views across multiple computing devices. Unfortunately, traditional platform-centric computer security systems fail to coordinate security processing within such information-centric data models, resulting in redundant and uncoordinated security operations. As such, the instant disclosure identifies a need for synchronized security systems and methods that are compatible with information-centric data models.

SUMMARY

As will be described in greater detail below, the instant disclosure generally relates to systems and methods for creating and synchronizing security metadata associated with data objects within a synchronized-data network. In one embodiment, the system may comprise a security module for: 1) identifying data objects encountered by devices within a synchronized-data network, 2) determining the trustworthiness of the data objects, and 3) generating security metadata that identifies the trustworthiness of the data objects. The system may also comprise a synchronization module for synchronizing both the data objects and the security metadata within the synchronized-data network.

In its simplest form, the synchronized-data network may comprise a plurality of computing devices (associated with either a single user or a plurality of users, such as a workgroup or enterprise) and at least one synchronized data object synchronized across the plurality of computing devices within the synchronized-data network. In one example, the system may synchronize data objects and security metadata within the synchronized-data network using a publish/subscribe protocol, such as REALLY SIMPLE SYNDICATION (RSS), ATOM, SIMPLE SHARING EXTENSIONS (SSE), FEEDSYNC, or the like. In this example, despite the presence of multiple devices within the synchronized-data network, the system may prevent devices within the synchronized-data network from performing unnecessary and redundant security operations.

In some examples, the system may cause receiving nodes within the synchronized-data network to buffer incoming synchronization data (i.e., synchronized data objects and security metadata) in order to facilitate (if necessary) re-ordering of the same. In an additional example, the system may package a data object with its associated security metadata in order to mitigate potential race conditions between receipt of a new data object and its associated security metadata. The system may also arrange, order, or otherwise stage the transmission of data objects and their associated security metadata in a manner that minimizes or eliminates the need for receiving/subscribing nodes to buffer incoming synchronization data.

In certain embodiments, the system may prevent devices within the synchronized-data network from accessing new or modified data objects until the system has been able to determine the trustworthiness of the new or modified data objects. In addition, the system may, upon identifying a need to perform a security operation on a new or modified data object, offload or load balance the security operation within the synchronized-data network. For example, the system may offload a resource-intensive security operation from a mobile computing device (such as a mobile phone or PDA) within the synchronized-data network to a more capable computing device within the synchronized-data network (such as a desktop or server).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure generally relates to systems and methods for creating and synchronizing security metadata within a synchronized-data network. The following will provide, with reference to FIGS. 1-3, detailed descriptions of exemplary systems for creating and synchronizing security metadata within a synchronized-data network. Detailed descriptions of corresponding exemplary computer-implemented methods will also be provided in connection with FIGS. 4 and 5. In addition, descriptions of an exemplary computing system and network architecture capable of implementing one or more of the embodiments described and/or illustrated herein will also be provided in connection with FIGS. 6 and 7.

Figure 1:
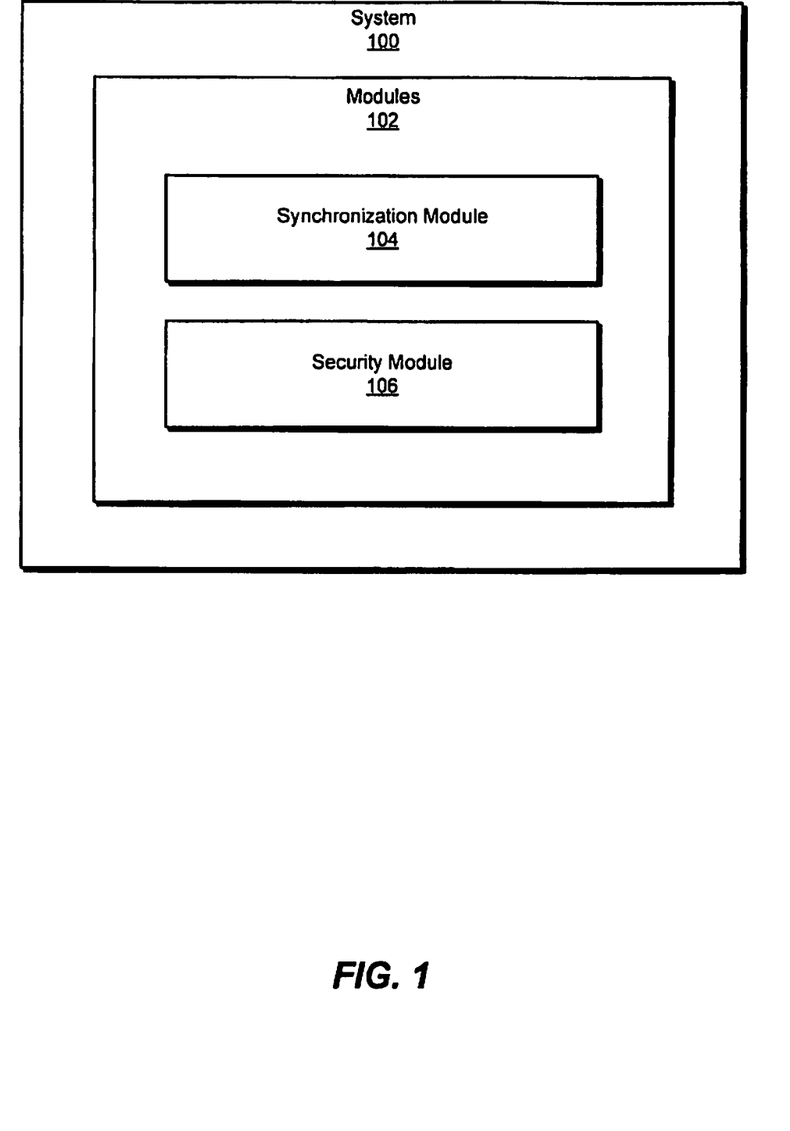
FIG. 1 is a block diagram of an exemplary system for creating and synchronizing security metadata within a synchronized-data network according to at least one embodiment.

FIG. 1 is a block diagram of an exemplary system 100 for creating and synchronizing security metadata within a synchronized-data network. As illustrated in this figure, exemplary system 100 may comprise one or more modules 102 for performing one or more tasks. For example, exemplary system 100 may comprise a synchronization module 104 for synchronizing data objects within a synchronization-data network. Exemplary system may also comprise a security module 106 for determining the trustworthiness of data objects encountered by computing devices within a synchronization-data network. Although not illustrated in FIG. 1, exemplary system 100 may also comprise one or more additional modules for creating and synchronizing security metadata within a synchronized-data network.

In certain embodiments, one or more of modules 102 in FIG. 1 may represent one or more software applications or programs that, when executed by a computing device, may cause the computing device to perform one or more tasks required to create and synchronize security metadata within a synchronized-data network. For example, as will be described in greater detail below, one or more of modules 102 may represent software modules configured to run on one or more computing devices, such as the devices of system 200 in FIG. 2 (e.g., first computing device 202 and second computing device 204), the devices of system 300 in FIG. 3, (e.g., first synchronized-data subnetwork 302 and second synchronized-data subnetwork 304), computing system 610 in FIG. 6, and/or portions of exemplary network architecture 700 in FIG. 7. One or more modules 102 in FIG. 1 may also represent all or portions of one or more special-purpose computers configured to perform one or more tasks required to create and synchronize security metadata within a synchronized-data network.

Figure 2:
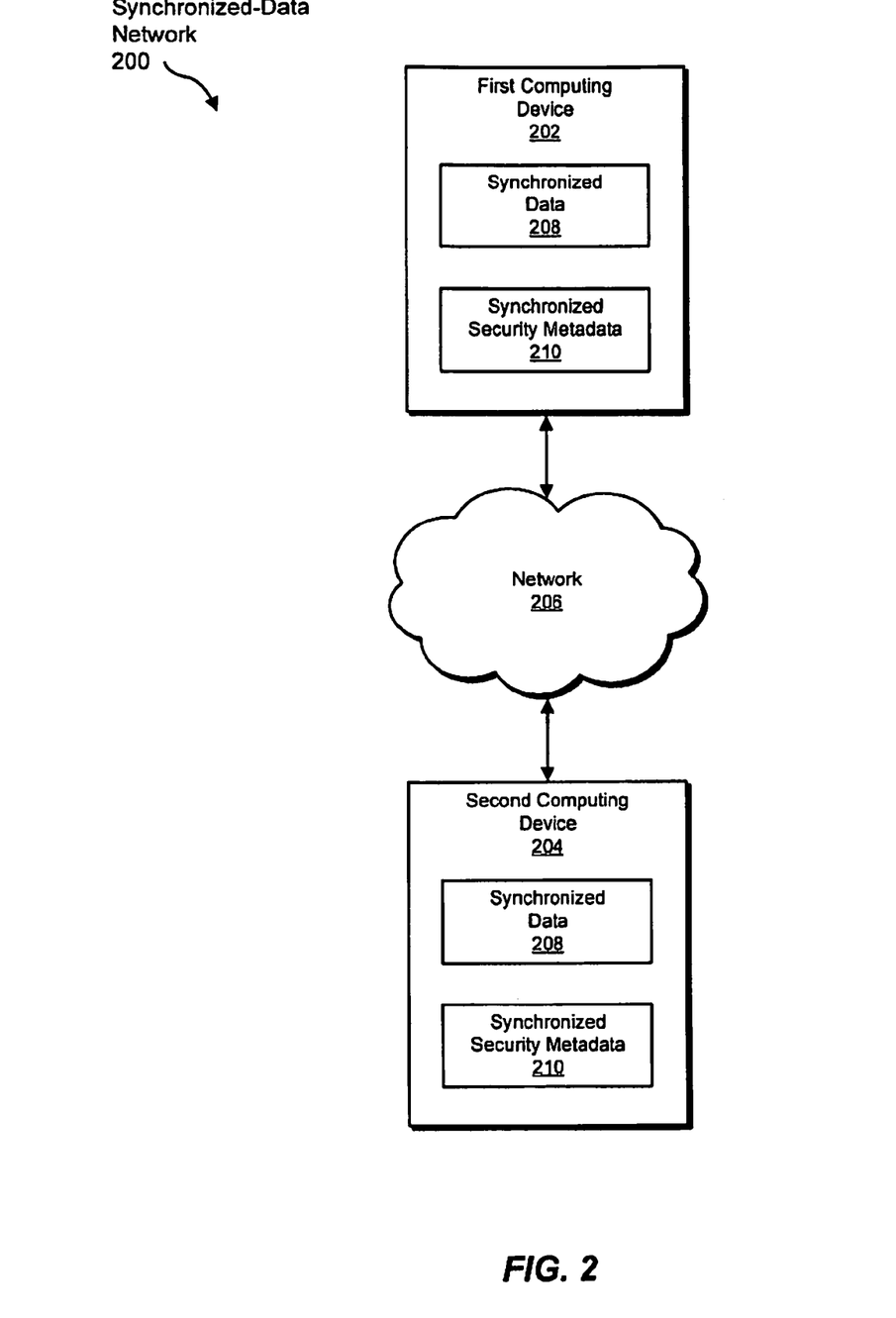
FIG. 2 is a block diagram of an exemplary system for creating and synchronizing security metadata within a synchronized-data network according to an additional embodiment.

In its simplest form, a synchronized-data network may comprise a plurality of computing devices and at least one synchronized data object. For example, as illustrated in FIG. 2, an exemplary synchronized-data network 200 may comprise a first computing device 202 in communication with a second computing device 204 via a network 206. The phrase "synchronized data object," as used herein, generally refers to a data object that is replicated and synchronized across a plurality of computing devices. In a synchronized-data network, modifications made to a synchronized data object on one device may be automatically propagated to all other subscribed devices within the synchronized data network. Examples of synchronized-data networks include, without limitation, WINDOWS LIVE MESH, UNISON, RSYNC, or the like.

First and second computing devices 202 and 204 generally represent any type or form of computing device. Examples of computing devices 202 and 204 include, without limitation, laptops, desktops, servers, cellular phones, personal digital assistants (PDAs), digital cameras, multimedia players, embedded systems, combinations of one or more of the same, or any other suitable computing device.

Network 206 generally represents any medium capable of facilitating communication or data transfer. Examples of network 206 include, without limitation, an intranet, a wide area network (WAN), a local area network (LAN), a personal area network (PAN), the Internet, power line communications (PLC), a cellular network (e.g., GSM network), or the like. Network 206 may facilitate communication or data transfer using wireless or wired connections.

As mentioned above, one or more of modules 102 in FIG. 2 may be stored and configured to run on computing devices 202 and/or 204 in FIG. 2. Furthermore, one or more of modules 102 may be shared between computing devices 202 and 204, meaning that the same module may be configured to operate simultaneously on separate devices for a single purpose. In both cases, and as will be described in greater detail below, modules 102 may enable computing devices 202 and/or 204 to create and synchronize security metadata within synchronized-data network 200.

In certain embodiments, each device within synchronized-data network 200 may be associated with a single user. For example, first computing device 202 may represent a user's desktop computer while second computing device 204 may represent the user's mobile computing device (such as a mobile phone or laptop). In this example, and as will be explained in greater detail below, synchronized-data network 200 may automatically synchronize data 208 and security metadata 210 in FIG. 2 between the user's desktop computer (first computing device 202) and the user's mobile computing device (second computing device 204). In an additional embodiment, first computing device 202 may represent a user's local computing device (such as a desktop) while second computing device 204 may represent a remote computing or storage device associated with the user (such as a third-party network drive).

In an additional embodiment, synchronized-data network 200 may contain devices that are associated with a plurality of users. For example, first computing device 202 may represent a desktop computer of a first user while second computing device 204 may represent a laptop of a second user. In this example, and as will be explained in greater detail below, synchronized-data network 200 may automatically synchronize data 208 and security metadata 210 in FIG. 2 between each user's computer (i.e., first computing device 202 and second computing device 204). Synchronized-data network 200 may be made up of a variety of user groups, such as groups of co-workers, family members, friends, associations, or any other suitable group.

Figure 3:
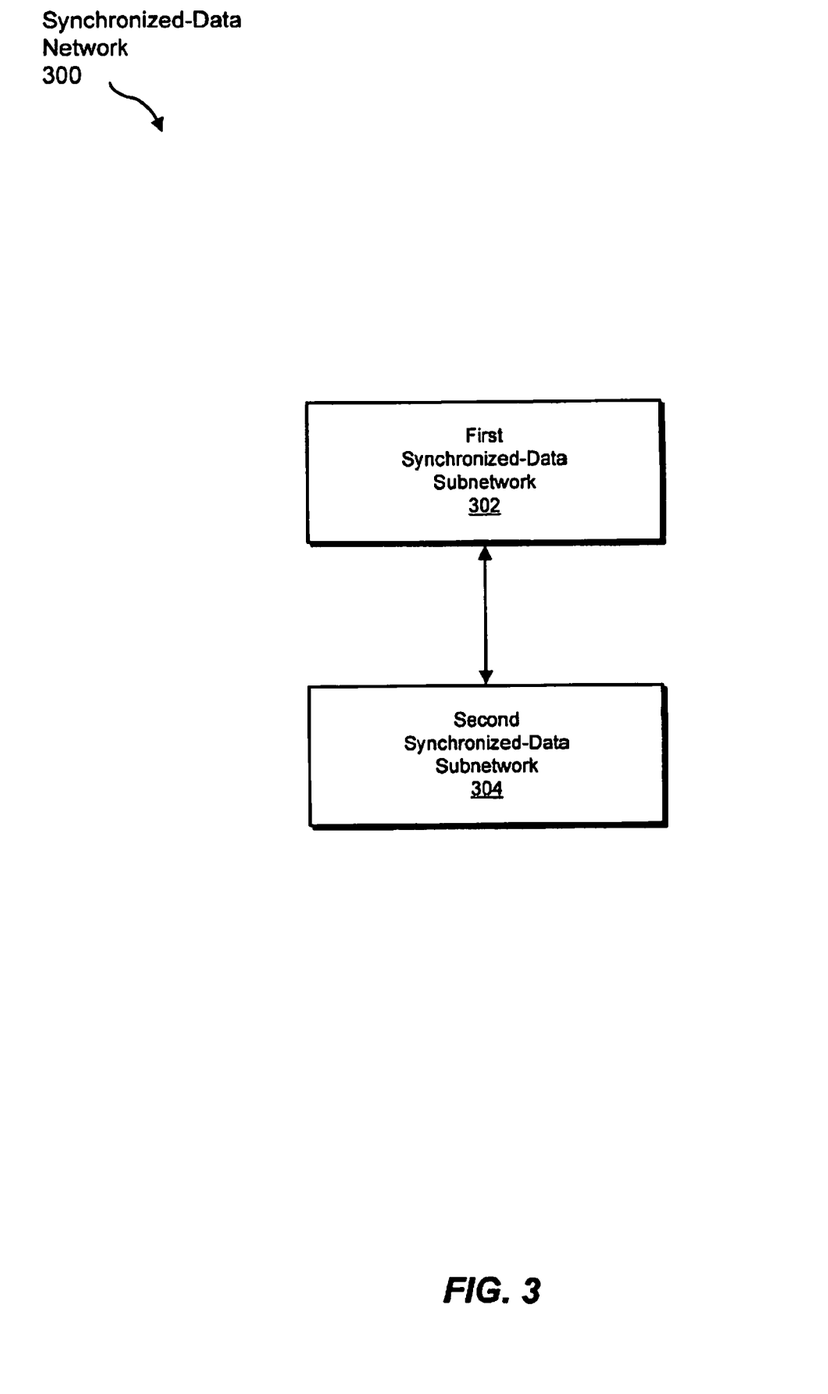
FIG. 3 is a block diagram of an exemplary system for creating and synchronizing security metadata within a synchronized-data network according to an additional embodiment.

In some embodiments, a synchronized-data network may be made up of a plurality of synchronized-data subnetworks. For example, as illustrated in FIG. 3, synchronized-data network 300 may comprise a first synchronized-data subnetwork 302 and a second synchronized-data subnetwork 304. In this example, first synchronized-data subnetwork 302 may comprise a plurality of synchronized devices associated with a first group (such as a company or enterprise) while second synchronized-data subnetwork 304 may comprise a plurality of synchronized devices associated with a second group (such as a related company or enterprise).

Figure 4:
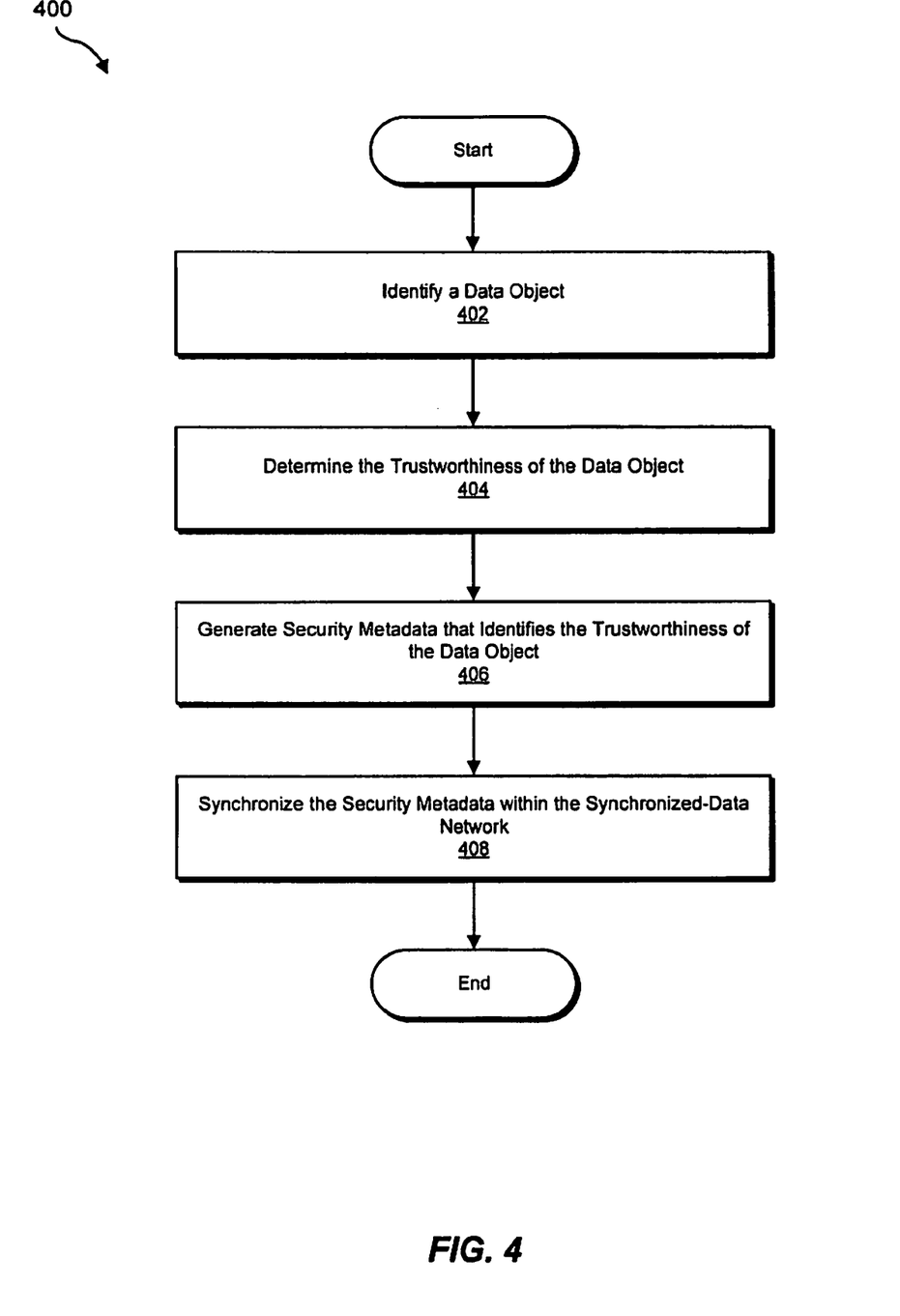
FIG. 4 is a flow diagram of an exemplary computer-implemented method for creating and synchronizing security metadata within a synchronized-data network according to at least one embodiment.

FIG. 4 is a flow diagram of an exemplary method 400 for creating and synchronizing security metadata within a synchronized-data network. As illustrated in this figure, at step 402 the system may identify a data object. For example, security module 106 in FIG. 1 (which, in certain embodiments, may be stored and configured to run on first computing device 202 in FIG. 2) may identify a data object loaded onto, downloaded by, accessed by, or otherwise encountered by first computing device 202. The phrase "data object" generally refers to any type or form of data that may be synchronized within a synchronized-data network. Examples of data objects include, without limitation, computer-readable data blocks, files (such as executables, installation packages, emails, etc.), or any other form of computer-readable information.

In certain embodiments, the system may identify a data object in step 402 before it is loaded onto or otherwise stored on a computing device within the synchronized data network. For example, security module 106 in FIG. 1 may identify an attempt by first computing device 202 in FIG. 2 to download a file from a server. In alternative embodiments, the system may identify a data object after it has been loaded or stored on a computing device within the synchronized-data network.

At step 404, the system may determine the trustworthiness of the data object. For example, security module 106 in FIG. 1 (which, as described above, may be stored and configured to run on first computing device 202) may determine the trustworthiness of the data object identified in step 402. Security module 106 may determine the trustworthiness of data objects in a variety of ways. For example, security module 106 may: 1) determine whether a digital signature for the data object matches a digital signature for a known file (with known trustworthiness attributes), 2) execute the data object within a virtual, emulated, or sandbox computing environment to determine whether the data object contains malicious payload, or 3) determine the trustworthiness of the data object through any other suitable means.

At step 406, the system may generate security metadata for the data object that identifies the trustworthiness of the data object. For example, security module 106 in FIG. 1 may generate security metadata that identifies the trustworthiness of the data object identified in step 402. The phrase "security metadata," as used herein, generally refers to any type or form of data that identifies at least one security characteristic of a data object. For example, security metadata may identify the source of origin of a data object, a digital signature for a data object, a creation or modification date for a data object, trust and security attributes for a data object (e.g., whether the data object may be accessed, copied, transmitted, or executed, whether there are any limitations on access or execution of the data object, etc.), or any other characteristic that may be used to determine the trustworthiness of a data object.

At step 408, the system may synchronize the security metadata created in step 406 within the synchronized-data network. The system may synchronize the security metadata within the synchronized-data network in a variety of ways. In one example, the system may utilize the existing synchronization mechanism employed by the synchronized-data network to synchronize the security metadata. For example, the system may synchronize the security metadata within the synchronized-data network using a publish/subscribe protocol. Examples of publish/subscribe protocols include, without limitation, XML-based protocols such as REALLY SIMPLE SYNDICATION (RSS), ATOM feeds, SIMPLE SHARING EXTENSIONS (SSE), FEEDSYNC feeds, or the like.

The system may perform the elements of steps 406 and 408 in any order. For instance, the system may identify features of a data object relevant to determining trustworthiness. The system may then generate and synchronize security metadata containing these features. The system may later determine the trustworthiness of the data object based in part on the metadata.

For example, security module 106 in FIG. 1 may, upon creating security metadata that identifies the trustworthiness of the data object identified in step 402, cause first computing device 202 in FIG. 2 to publish this security metadata to second computing device 204 via network 206. Thus, despite the presence of multiple devices within synchronized-data network 200, the system may prevent the devices within synchronized-data network 200 from performing unnecessary and redundant security operations. Upon completion of step 408 in FIG. 4, exemplary method 400 may terminate.

In one embodiment, the system may prevent devices within the synchronized-data network from accessing new or modified data objects until the system has been able to determine the trustworthiness of the new or modified data objects. For example, if the system determines in step 404 that the data object is untrustworthy, then the system may prevent the data object from being synchronized within the synchronized-data network. For example, security module 106 in FIG. 1 may quarantine, delete, prevent access to, or otherwise contain the untrustworthy data object.

Alternatively, if the system determines that the data object is trustworthy, then the system may allow the data object to be synchronized within the synchronized-data network. For example, synchronization module 104 in FIG. 1 (which may, as detailed above, be stored and configured to run on first computing device 202 in FIG. 2) cause first computing device 202 to publish the new or modified data object to each computing device within synchronized-data network 200 (i.e., second computing device 202).

Exemplary method 400 in FIG. 4 may also create and synchronize security metadata for modified data objects within synchronized-data networks. For example, the system may: 1) identify a proposed modification to a data object, 2) determine the trustworthiness of the proposed modification, 3) modify the security metadata for the data object to identify the trustworthiness of the proposed modification, and then 4) synchronize the modified security metadata within the synchronized-data network. If the system determines that the proposed modification to the data object is trustworthy, then the system may allow the data object to be modified in accordance with the proposed modification and allow the modified data object to be synchronized within the synchronized-data network. Alternatively, if the system determines that the proposed modification to the data object is untrustworthy, then the system may prevent the data object from being modified.

As detailed above in connection with exemplary method 400 in FIG. 4, an originating node (such as first computing device 202 in FIG. 2) within a synchronized-data network may transfer data objects and their associated security metadata to receiving/subscribing nodes (such as second computing device 204) within the synchronized-data network by utilizing the underlying synchronization mechanism employed by the synchronized-data network. Depending upon the security-awareness of the underlying synchronization mechanism or the format of the data objects, the data objects and their associated security metadata may or may not be packaged together. As such, a receiving node may or may not receive a data object and its associated security metadata at the same time or in any particular order. For example, second computing device 204 in FIG. 2 may receive, from first computing device 202, security metadata associated with a data object before it receives the actual data object, or vice versa.

Thus, in one example receiving nodes within a synchronized-data network may buffer incoming synchronization data (i.e., synchronized data objects and security metadata) in order to facilitate (if necessary) re-ordering of the same. For example, a synchronization module (such as synchronization module 104 in FIG. 1) stored and configured to run on second computing device 204 in FIG. 2 may buffer all synchronization data received from first computing device 202 via the underlying synchronization mechanism employed by synchronized-data network 200. Buffering synchronization data in this manner may enable synchronization module 104 to match all incoming data objects with their associated security metadata, and vice versa, regardless of the order in which the data objects and security metadata are received, thereby mitigating potential race conditions between receipt of a new data object and its associated security metadata.

In an additional embodiment, originating nodes (such as first computing device 202 in FIG. 2) and/or the underlying synchronization mechanism employed by the synchronized-data network (such as synchronization module 104 in FIG. 1) may package data objects with their associated security metadata to minimize or eliminate the need for receiving/subscribing nodes (such as second computing device 204 in FIG. 2) to buffer synchronization data in order to facilitate re-ordering of the same. For example, synchronization module 104 and/or first computing device 202 may package data objects with their associated security metadata prior to transmitting the same to second computing device 204, thereby eliminating or reducing the need for second computing device 204 to buffer incoming synchronization data.

In an additional example, originating nodes and/or the underlying synchronization mechanism employed by the synchronized-data network may arrange, order, or otherwise stage the transmission of data objects and their associated security metadata in a manner that minimizes or eliminates the need for receiving/subscribing nodes to buffer incoming synchronization data. The manner in which the underlying synchronization mechanism and/or originating nodes arrange, order, or otherwise stage transmission of synchronization data may depend upon the underlying synchronization protocol employed, the degree of semantic association or binding between data objects and their associated security metadata, the transmission and delivery characteristics of the synchronized data network, or any other design variable.

Figure 5:
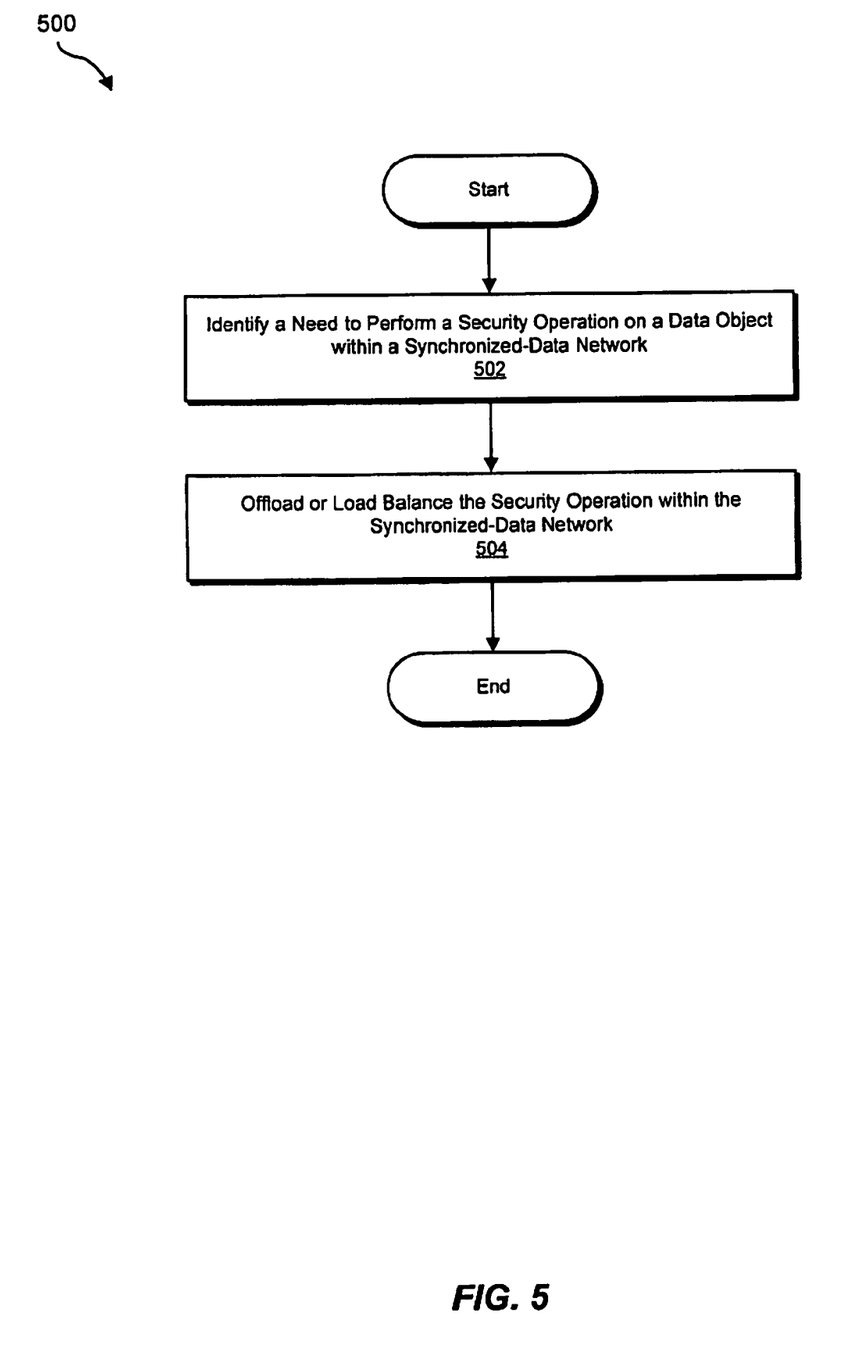
FIG. 5 is a flow diagram of an exemplary computer-implemented method for creating and synchronizing security metadata within a synchronized-data network according to an additional embodiment.

In certain embodiments, the system may offload or load balance security operations within the synchronized-data network. FIG. 5 is a flow diagram of an exemplary computer-implemented method 500 for offloading or load balancing security operations within a synchronized-data network. As illustrated in this figure, at step 502 the system may identify a need to perform a security operation on a data object to determine the trustworthiness of the data object. For example, security module 106 in FIG. 1 (which may, as detailed above, be stored and configured to run on first computing device 202 in FIG. 2) may identify an attempt by first computing device 202 to access a new or modified data object.

As detailed above, one or more of the computing devices within synchronized-data network 200 in FIG. 2 may represent computing devices (such as mobile phones or PDAs) having limited computing resources. In this example, the system may decide to offload or load balance a security operation for determining the trustworthiness of the data object within the synchronized-data network. For example, security module 106 in FIG. 1 may offload a security operation for determining the trustworthiness of a data object from first computing device 202 (which, in this example, may represent a mobile phone or PDA) to second computing device 204 (which may represent a server or desktop computing device). Second computing device 204 may then: 1) perform the security operation, 2) generate security metadata that identifies the trustworthiness of the data object, and then 3) cause this security metadata to be synchronized within synchronized-data network 200.

In an additional example, the system may offload security operations to a server within a synchronized-data network, regardless of the computing capabilities of each device within the synchronized-data network. For example, each device within a synchronized-data network may offload security operations to a server configured to scan or otherwise determine the trustworthiness of each new or modified data object encountered by devices within the synchronized-data network. In this example, the server may: 1) perform a security operation on each data objected encountered within the synchronized-data network, 2) generate security metadata that identifies the trustworthiness of each data object, and then 3) cause this security metadata to be synchronized within the synchronized-data network.

In certain embodiments, the system may determine whether to offload a security operation to an additional device within the synchronized-data network based on various administrator-defined policies. For example, an administrator or user of a synchronized-data network may create a policy that mandates that all mobile computing devices offload security operations to more capable computing devices. Similarly, an administrator or user of the synchronized-data network may create a policy that mandates that all security operations be performed by a single device, such as a dedicated server, within the network.

In some embodiments, the security metadata associated with each data object may contain attributes that enable nodes within the synchronized-data network to coordinate and cooperate on the offloading or load balancing of data objects within the synchronized-data network. For example, an offloading node (such as a mobile phone or PDA) may define, within security metadata for a data object, an attribute that indicates that trustworthiness of the data object has yet to be determined and requires evaluation by a more capable device (e.g., "trustworthiness pending offloaded evaluation"). When another node within the synchronized-data network performs the security evaluation, the associated security metadata may be updated and re-synchronized within the synchronized-data network without any auxiliary messaging between the cooperating nodes. As with earlier embodiments, this example may avail itself of the underlying synchronization mechanism used by the synchronized-data network, rather than requiring a separate messaging channel for security coordination among the nodes.

By synchronizing security metadata within a synchronized-data network, the systems and methods disclosed herein may avoid performing redundant and uncoordinated security processing within synchronized-data networks. Such systems and methods may reduce the overhead required to perform security operations within a synchronized-data network, potentially resulting in increased performance and reliability.

Figure 6:
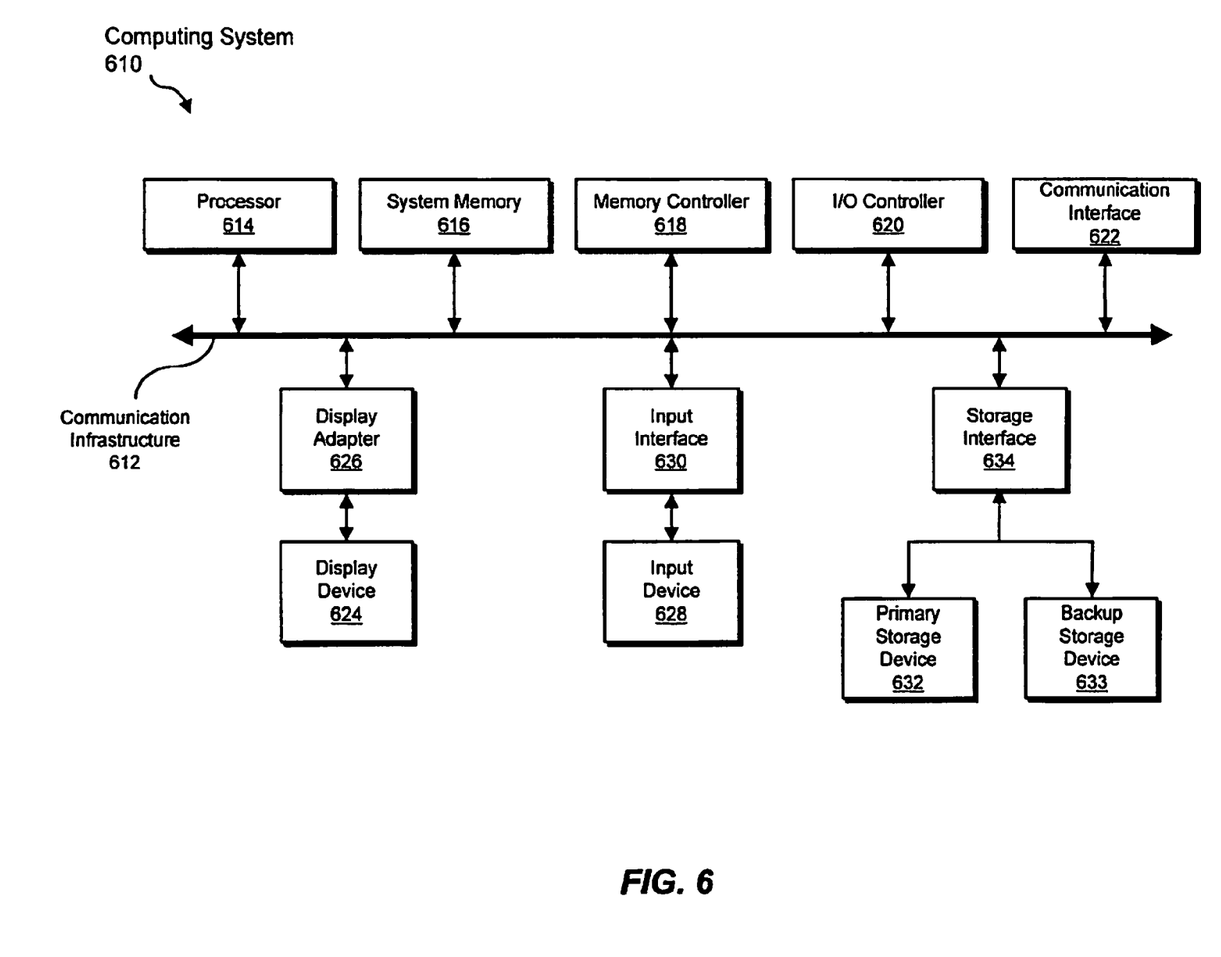
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, generating, synchronizing, publishing, preventing, modifying, allowing, preventing, load balancing, offloading, and limiting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, determining, generating, synchronizing, publishing, preventing, modifying, allowing, preventing, load balancing, offloading, and limiting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for identifying, determining, generating, synchronizing, publishing, preventing, modifying, allowing, preventing, load balancing, offloading, and limiting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless I EEE 802.11 network), a personal area network (such as a BLUETOOTH network or an IEEE 802.15 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, generating, synchronizing, publishing, preventing, modifying, allowing, preventing, load balancing, offloading, and limiting steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, generating, synchronizing, publishing, preventing, modifying, allowing, preventing, load balancing, offloading, and limiting steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the identifying, determining, generating, synchronizing, publishing, preventing, modifying, allowing, preventing, load balancing, offloading, and limiting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 7 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
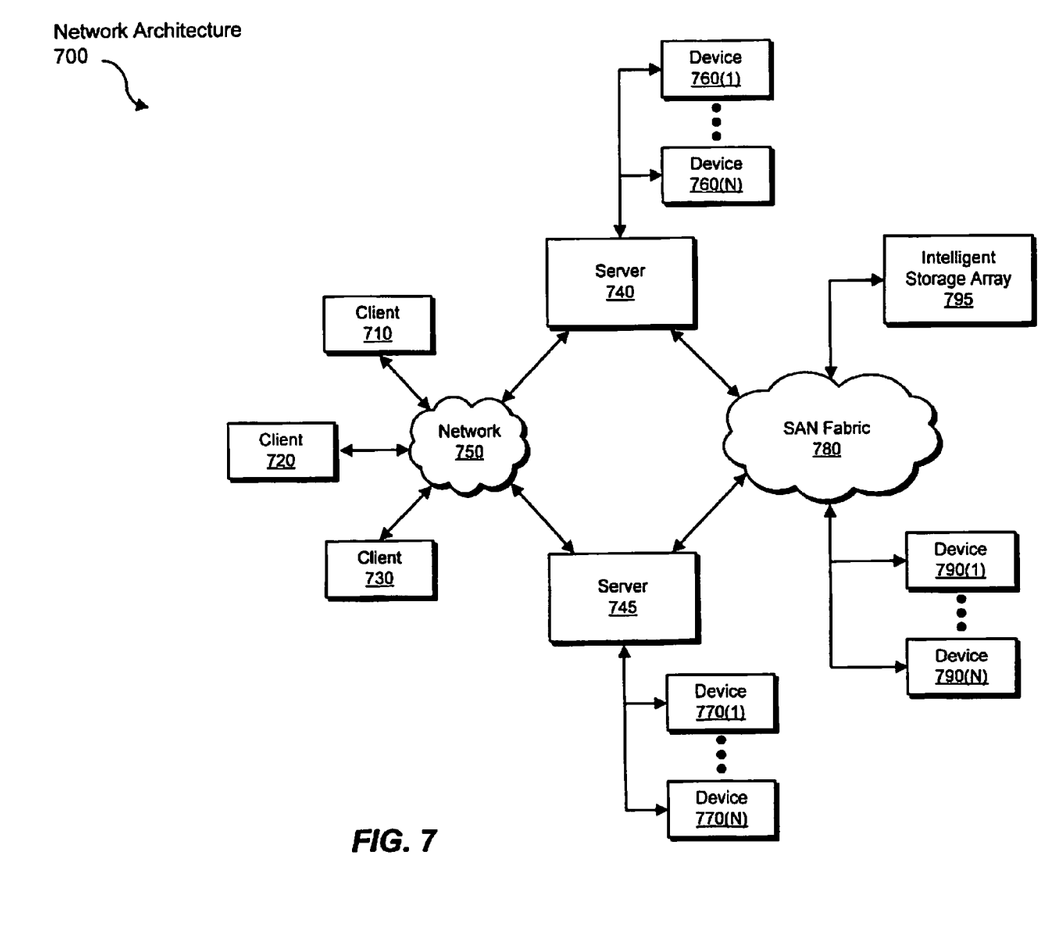
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, generating, synchronizing, publishing, preventing, modifying, allowing, preventing, load balancing, offloading, and limiting steps disclosed herein. Network architecture 700 may also be used to perform and/or be a means for performing other steps and features set forth in the instant disclosure.

As detailed above, one or more of the systems described herein may perform and/or be a means for performing either alone or in combination with other elements, one or more of the exemplary methods described and/or illustrated herein. For example, the systems described herein may perform a method for creating and synchronizing security metadata for data objects within a synchronized-data network that comprises: 1) identifying a data object, 2) determining the trustworthiness of the data object, 3) generating security metadata for the data object that identifies the trustworthiness of the data object, and 4) synchronizing the security metadata within the synchronized-data network.

In certain embodiments, the synchronized-data network may comprise a plurality of computing devices and at least one synchronized data object synchronized across each of the plurality of computing devices. At least one of the plurality of computing devices may comprise a network-based storage device, such as a server. The plurality of computing devices may be associated with a single user or a plurality of users, such as a user group, workgroup, or enterprise.

In certain embodiments, synchronizing the security metadata within the synchronized-data network may comprise publishing the security metadata within the synchronized-data network using a publish/subscribe protocol. Synchronizing the security metadata may also comprise: 1) packaging the security metadata with the data object and/or 2) arranging, staging, or ordering synchronization of the security metadata with the data object to mitigate potential race conditions.

The method may also comprise: 1) determining that the data object is untrustworthy and then 2) preventing the data object from being synchronized within the synchronized-data network. Alternatively, the method may further comprise: 1) determining that the data object is trustworthy and then 2) allowing the data object to be synchronized within the synchronized-data network.

The method may also comprise: 1) identifying a proposed modification to the data object, 2) determining the trustworthiness of the proposed modification, 3) modifying the security metadata for the data object to identify the trustworthiness of the proposed modification, and then 4) synchronizing the modified security metadata within the synchronized-data network.

If the system determines that the proposed modification to the data object is trustworthy, then the system may: 1) allow the data object to be modified in accordance with the proposed modification and 2) allow the modified data object to be synchronized within the synchronized-data network. However, if the system determines that the proposed modification to the data object is untrustworthy, then the system may prevent the data object from being modified in accordance with the proposed modification.

In one embodiment, determining the trustworthiness of the data object may comprise: 1) identifying a need to perform a security operation on the data object to determine the trustworthiness of the data object and then 2) offloading or load balancing the security operation within the synchronized-data network. The system may coordinate offloading or load balancing of the security operation based on attributes of the security metadata.

In one embodiment, the method may further comprise buffering incoming synchronization data to mitigate race conditions. The method may also comprise limiting access to the security metadata to users or software with appropriate privileges.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for creating and synchronizing security metadata for data objects within synchronized-data networks, at least a portion of the method being performed by a computing device comprising at least one central processing unit, the method comprising:
    identifying a synchronized-data network, the synchronized-data network comprising a plurality of computing devices and a plurality of synchronized data objects that are synchronized across the plurality of computing devices;
    identifying a data object that is capable of being synchronized within the synchronized-data network;
    identifying a need to perform a security operation on the data object to determine the trustworthiness of the data object;
    offloading the security operation within the synchronized-data network by:
        determining, by performing the security operation, the trustworthiness of the data object;
        generating security metadata for the data object that identifies the determined trustworthiness of the data object;
        synchronizing the security metadata that identifies the determined trustworthiness of the data object within the synchronized-data network to prevent computing devices within the synchronized-data network from performing additional redundant trustworthiness determinations on the data object.

2. The method of claim 1, wherein synchronizing the security metadata within the synchronized-data network comprises publishing the security metadata within the synchronized-data network using a publish/subscribe protocol.

3. The method of claim 1, wherein synchronizing the security metadata within the synchronized-data network comprises at least one of:
    packaging the security metadata with the data object;
    arranging, staging, or ordering synchronization of the security metadata and the data object to mitigate race conditions.

4. The method of claim 1, wherein at least one of the plurality of computing devices comprises a network-based storage device.

5. The method of claim 1, wherein the plurality of computing devices are associated with:
    a single user;
    a plurality of users.

6. The method of claim 1, further comprising:
    determining that the data object is untrustworthy;
    in response to the determination that the data object is untrustworthy, preventing the data object from being synchronized within the synchronized-data network.

7. The method of claim 1, further comprising:
    determining that the data object is trustworthy;
    in response to the determination that the data object is trustworthy, allowing the data object to be synchronized within the synchronized-data network.

8. The method of claim 7, further comprising:
    identifying a proposed modification to the data object;
    determining the trustworthiness of the proposed modification;
    modifying the security metadata for the data object to identify the trustworthiness of the proposed modification;
    synchronizing the modified security metadata within the synchronized-data network.

9. The method of claim 1, wherein performing the security operation comprises load balancing the security operation within the synchronized data network.

10. The method of claim 9, further comprising coordinating offloading or load balancing of the security operation based on attributes of the security metadata.

11. The method of claim 1, further comprising limiting access to the security metadata to users or software with appropriate privileges.

12. The method of claim 1, further comprising buffering incoming synchronization data to mitigate race conditions.

13. A system for creating and synchronizing security metadata for data objects within synchronized-data networks, the system comprising:
    a security module and a synchronization module for:
        identifying a synchronized-data network, the synchronized-data network comprising a plurality of computing devices and a plurality of synchronized data objects that are synchronized across the plurality of computing devices;
        identifying a data object that is capable of being synchronized within the synchronized-data network;
        identifying a need to perform a security operation on the data object to determine the trustworthiness of the data object;
        offloading the security operation within the synchronized-data network by:
            determining, by performing the security operation, the trustworthiness of the data object;
            generating security metadata for the data object that identifies the determined trustworthiness of the data object;
            synchronizing the security metadata that identifies the determined trustworthiness of the data object within the synchronized-data network to prevent computing devices within the synchronized-data network from performing additional redundant trustworthiness determinations on the data object;
    at least one central processing unit configured to execute the security module and the synchronization module.

14. The system of claim 13, wherein the plurality of computing devices are associated with:
    a single user;
    a plurality of users.

15. The system of claim 13, wherein the security module is configured to run on each of the plurality of computing devices within the synchronized-data network.

16. The system of claim 13, wherein the synchronization module is configured to run on each of the plurality of computing devices within the synchronized-data network.

17. The system of claim 13, wherein the security module performs the security operation by load balancing the security operation within the synchronized-data network.

18. A non-transitory computer-readable medium comprising one or more computer-executable instructions that, when executed by a computing device, cause the computing device to:
- identify a synchronized-data network, the synchronized-data network comprising a plurality of computing devices and a plurality of synchronized data objects that are synchronized across the plurality of computing devices;
- identify a data object that is capable of being synchronized within the synchronized-data network;
- identify a need to perform a security operation on the data object to determine the trustworthiness of the data object;
- offload the security operation within the synchronized-data network by:
  - determining, by performing the security operation, the trustworthiness of the data object;
  - generating security metadata for the data object that identifies the determined trustworthiness of the data object;
  - synchronizing the security metadata that identifies the determined trustworthiness of the data object within the synchronized-data network to prevent computing devices within the synchronized-data network from performing additional redundant trustworthiness determinations on the data object.

* * * * *